United States Patent Office 3,111,101
Patented Nov. 19, 1963

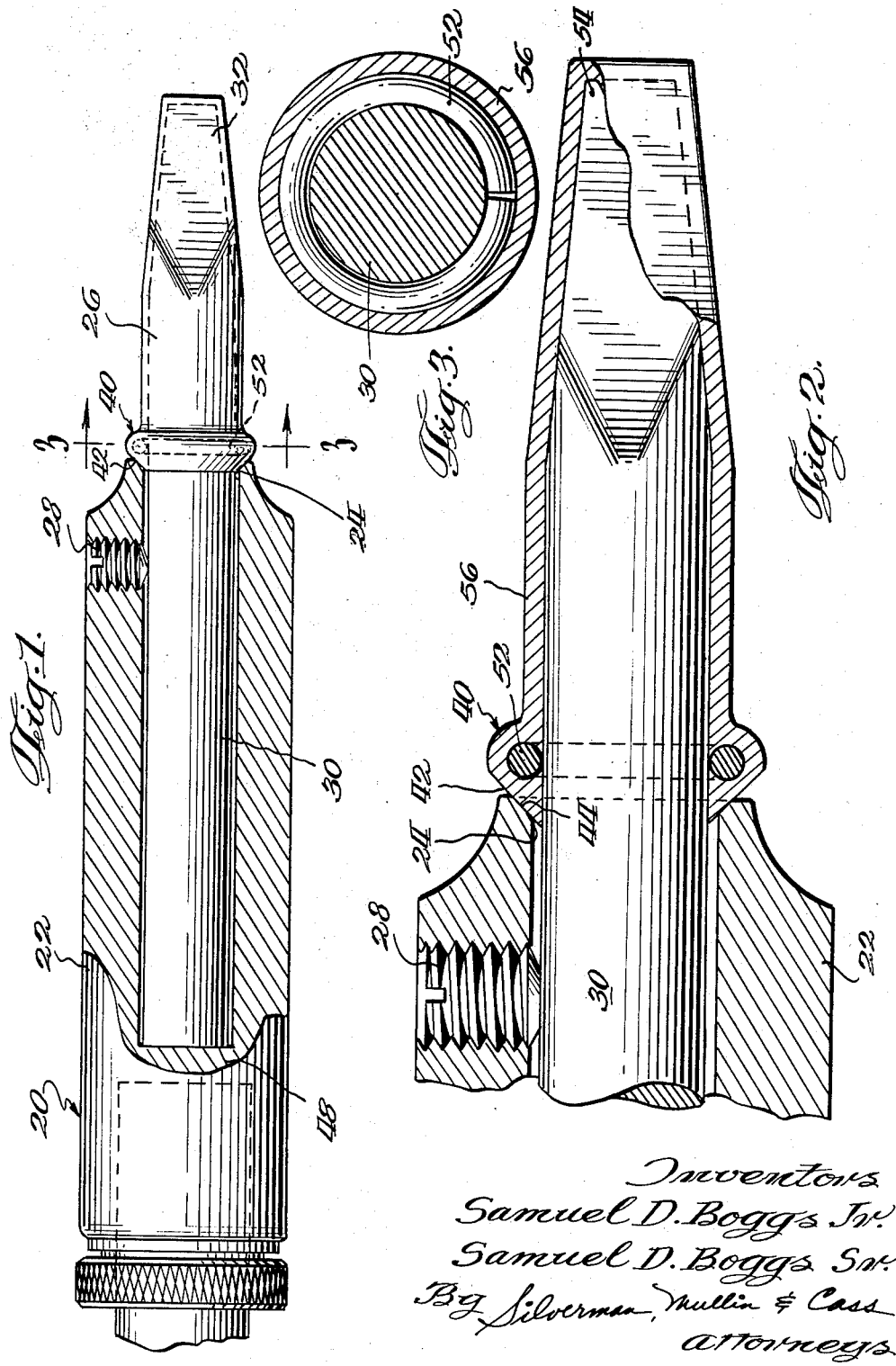

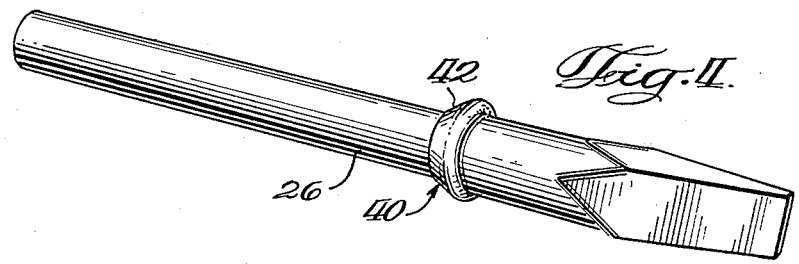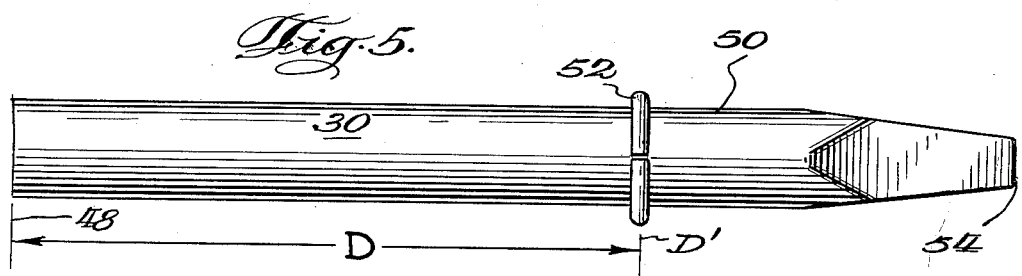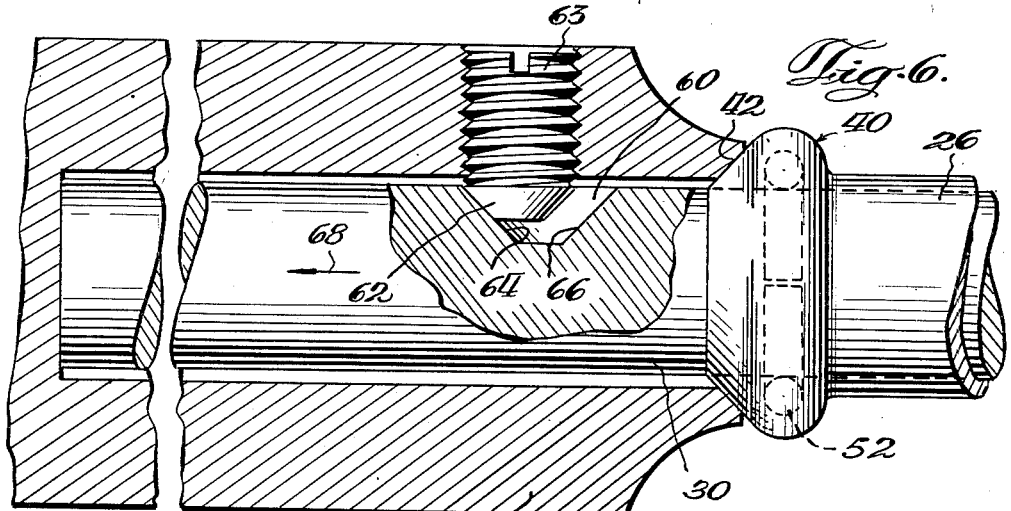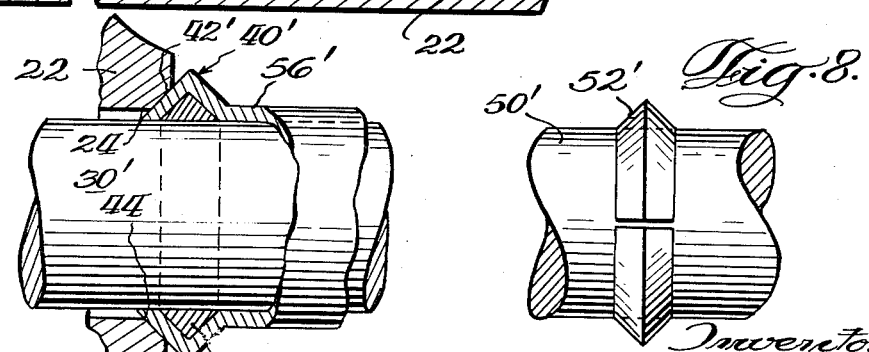

3,111,101
SOLDERING IRON
Samuel D. Boggs, Sr., Algonquin, and Samuel D. Boggs, Jr., Clarendon Hills, Ill.; said Samuel D. Boggs, Sr., assignor to said Samuel D. Boggs, Jr., doing business as Boggs Tool & Mfg. Co., Chicago, Ill.
Filed Dec. 5, 1960, Ser. No. 73,836
5 Claims. (Cl. 113—105)

This invention relates generally to soldering tools and more particularly, relates to improvements in a soldering iron such as commonly is used in soft soldering techniques whereby undesirable depositions of material on the interior of the tool are prevented.

The soldering tool with which the invention is concerned commonly is referred to as a "soldering iron" although the soldering tip is made of copper. Although copper is an excellent thermal conducting material, it is subject to corrosion and pitting especially as a result of long and sustained use of the tool such as encountered in industrial use thereof. It has been common to clad the copper tip in an iron or iron alloy jacket in order to prevent such undue corrosion and pitting of the copper soldering tip. This usually is accomplished by electrolytic deposition techniques to effect a build-up or plating of the metal around that portion of the soldering tip protruding from the barrel of the soldering tool.

In every instance of applying a solder joint, the surfaces to be soldered must be heated to a temperature at least equal to the melting point of the solder. From a practical standpoint, it is generally necessary to use a flux when soft soldering. A proper flux promotes better heat transfer in the melting of the solder. The flux also is instrumental in removing mild oxide, in preventing oxidation of the metal surfaces, in dissolving oxides that may form on the metal surfaces while they are heated to the soldering temperature and to promote mutual contact between atoms of the solder elements and the atoms of the metallic elements to be joined. During use of the tool and especially when used continuously for long periods of time, such as in industry, it is common for flux residues and perhaps excess flux and even solder to enter the barrel of the tool and deposit on interior surfaces of the tool and on the shank of the soldering tip. Such undesirable depositions of material often can occur on electrical contacts and elements of the familiar electrical soldering tool all with accompanying disadvantages.

One such disadvantage is the resulting locking or freezing of the soldering tip on the inside of the barrel so that it becomes very difficult to remove the tip should it be desired to replace the same with either the same size or a different size of tip. Such deleterious flux accumulations also interfere with proper heat transfer on the interior of the electrical soldering tool required for heating of the tip thereby decreasing the efficiency with which the soldering operation can be carried out. The principal point at which such flux residues and possibly excess flux enter the barrel is at the mouth thereof which usually is somewhat larger in diameter than the shank of the soldering tip.

Accordingly, it is a primary object of the invention to provide a soldering tool of the character described which is constructed to substantially eliminate the disadvantages hereinabove enumerated.

Another object of the invention is to provide a soldering iron of the character described in which a releasable seal is provided at the mouth of the barrel of the tool when the soldering tip is installed so as to prevent entry of excess flux or flux residues into the interior of the barrel during use of the tool.

Another object of the invention is to provide a soldering iron as described which includes a soldering tip having an annular sealing abutment adapted to cooperate with the mouth of the barrel of the tool for preventing entry of excess flux and/or flux residues into the barrel of the tool.

Another object of the invention is to provide a soldering iron as described in which the barrel and the soldering tip have cooperating releasable sealing means for preventing entry into the barrel of deleterious flux residues and/or excess flux during use of the tool.

Another object of the invention is to provide a soldering iron of the character described in which said sealing means can be provided easily, rapidly and economically for all sizes of soldering irons and soldering tips. An ancillary object is to provide a soldering tip having the sealing means which can be used with conventional soldering irons without requiring modification of the soldering iron to any material degree, if at all.

Another object of the invention is to provide a soldering iron of the character described having novel means for biasing the soldering tip inwardly into the barrel of the soldering iron for facilitating the sealing of the mouth of the barrel of the soldering iron.

Other objects of the invention will be seen to reside in the provision of a soldering iron as described which is economical and convenient to achieve, which is sturdy and reliable and which will accomplish the objects set forth therefor in an efficient and satisfactory manner.

The foregoing and other objects of the invention will become apparent as the description thereof evolves. A preferred embodiment of the invention has been described in detail in the specification hereof and illustrated in the accompanying drawings. It is contemplated that minor variations in the size, arrangement, proportion and construction of the several parts thereof may occur to the skilled artisan without departing from the scope or sacrificing any of the advantages of the invention.

In the drawings wherein the same characters of reference are employed to identify the same or equivalent parts throughout the several figures thereof:

FIG. 1 is a fragmentary plan view of a soldering tool embodying the invention and with portions in section to illustrate details thereof.

FIG. 2 is a fragmentary sectional view taken transversely through the barrel and soldering tip of the tool.

FIG. 3 is a sectional view taken through the said tool along the line 3—3 of FIG. 1 and in direction indicated generally.

FIG. 4 is a perspective view of the soldering tip employed in said tool.

FIG. 5 is a plan view of the soldering tip of said tool in a preliminary stage of making the same.

FIG. 6 is a fragmentary sectional view taken through a modified form of the soldering tool embodying the invention.

FIG. 7 is a fragmentary sectional view taken through a modified form of the soldering tip of the tool.

FIG. 8 is a fragmentary plan view of the soldering tip shown partially in FIG. 7 in a preliminary stage of assembly thereof.

Although electrical soldering irons are in most common use, the invention can be utilized in connection with non-electrical soldering tools as well. Also, the invention can be practiced both with copper and iron clad soldering tips.

Referring now to the drawings, the reference character 20 designates generally an electrically-heated soldering tool of which only pertinent portions insofar as describing the invention is concerned have been illustrated. The tool 20 includes a generally cylindrical barrel 22 having a mouth 24 at one extremity thereof in which is telescopically engaged a soldering tip 26. The electrical heating means and the handle of the soldering tool are of conventional construction and hence have not been illustrated in detail. Ordinarily, the soldering tip 26 is retained in position inside the barrel 24 by suitable means such as a set screw 28 threaded into engagement with the shank 30 of the soldering tip. The soldering tip 26 has a tapered extremity 32 exterior of the barrel which is heated to the high temperatures desired for the soldering operation.

The conventional soldering iron has a mouth 24 of greater diameter than the outside diameter of shank 30, and generally, the amount by which the diameter of the mouth is so greater may be more than required merely for providing sufficient clearance for telescopic engagement of the soldering tip therein. In any event, the clearance between the shank 30 and the inside circumference of the barrel is sufficient to permit entry into the barrel of flux residues and excess flux and even carelessly handled solder. During long periods of sustained use of the soldering iron it is common for such residues and deleterious substances to be deposited and/or collect on the interior surfaces of the barrel, on the shank 30 and even on the electrical elements of the soldering tool with accompanying disadvantages and reduction in efficiency of the tool. These disadvantages have resulted both with copper and iron clad soldering tips.

The invention provides novel means on the soldering tip which cooperates with the mouth of the barrel to prevent undesirable entry of deleterious material during use of the soldering iron. Said means is designated generally 40 and comprises an enlarged annular formation upstanding on the shank 30 of the soldering tip and located to abut against the barrel of the tool in sealing engagement over the mouth of the barrel when the tip is installed. To facilitate an improved sealing of the mouth of the barrel, the surface 42 of the formation 40 facing inwardly toward the barrel may be machined flat and inclined relative to the longitudinal axis of the soldering tip and the lip of the mouth 24 also may be machined to provide a complementary flat inclined surface 44 thereon which can be matingly engaged with surface 42 when the tip is installed. The location of said sealing formation 40 on the shank 30 is selected at a distance from the inner end 48 of the soldering tip corresponding to the length of the barrel occupied by the shank 30 when the tip is installed so that the formation 40 will abut the barrel when the tip is so installed.

Properly locating the annular sealing formation 40 and forming the same on the soldering tip 26 for the various sizes of soldering tips commonly used is achieved rapidly and economically. Referring to FIG. 5, a conventional copper tip 50 is illustrated. It is first determined how far from the inner end 48 of the tip 50 the formation 40 is to be located, which will depend upon the size of the soldering tool. This distance is designated D and the corresponding location on the soldering tip is designated $D^1$. A split ring 52 is slipped over the shank 30 and frictionally engaged thereon at the location $D^1$. The internal diameter of the ring 52 is selected so that it will be slightly less than the outside diameter of shank 30 and thereby tightly engage over the shank when the ring 52 is released. The split ring 52 will remain axially immovable on the shank 30 for the operation subsequently to be performed and accurately positioned to achieve the desired functions of the sealing formation 40 when completed.

The tip 50 with the ring 52 frictionally engaged thereon then is immersed in an electrolytic bath for a sufficient length of time to plate a jacket 56 of iron or iron alloy thereon which is continuous from the outer extremity 54 to the ring 52 and over the ring as well. The thickness of the jacket 56 is determined by the amount of protective plating desired for the copper tip 50, the combined thickness of the jacket 56 and the ring 52 being sufficient to provide the desired upstanding formation 40. The deposition of metal over the ring 52 secures said ring on the shank 30 of the tip and holds same in the desired location on said shank 30. The soldering tip is then machined to provide the flat, inclined surface 42 on formation 40.

Referring to FIGS. 7 and 8, there is shown a modified form of the invention. In this instance, the split ring 52' is substantially triangular in cross-section as distinguished from the ring 52 which is substantially circular in cross-section. The split ring 52' is available as a stock material and is convenient to use since plating the jacket 56' over the ring 52' will result in a flat, inclined inwardly facing surface 42' directly or which will require very little additional machining, as in the case of soldering tip 26.

During mass production of the soldering tips 26, there may result small deviations from the desired location of the upstanding sealing formations 40 or 40' on the shanks 30 so that upon installation of the soldering tip there is some play between the sealing formations and the mouth of the barrel. To insure a tight abutment of the sealing formation 40 or 40' against the mouth of the barrel, we provide means for biasing the tip inwardly into the barrel after it is installed as illustrated in FIG. 6. A notch or recess 60 is formed on the shank 30 inboard of the formation 40 and aligned with the set screw 28. The inner end 62 of the set screw is frusto-conical in configuration and the recess 60 is formed with divergent opposite walls 64 and 66. When the set screw is tightened, the end 62 thereof will ride on wall 64 and bias the tip inwardly into the barrel in the direction of the arrow 68 and cause the sealing formation 40 to bear against the mouth of the barrel 22 sealing off the same. It will be appreciated that although a more effective sealing of the mouth of the barrel is assured in this way, the upstanding formation 40 still will prevent substantial quantities of undesirable materials from entering the barrel even when not bearing tightly against the barrel because of the elevation thereof.

It is believed that the invention has been described in sufficient detail to enable the skilled artisan to understand and practice the same. The invention has been pointed out in the claims hereto appended in language intended to be broadly and liberally construed commensurate with the progress in the arts and sciences contributed thereby.

What it is desired to secure by Letters Patent of the United States is:

1. In a soldering iron having a barrel open at one end thereof for receiving a soldering tip therein, a soldering tip comprising, a solid cylindrical metal member having a shank portion at one end thereof adapted to be slidingly engaged entirely within said barrel, a tapered opposite end and a body portion between said tapered end and shank portion, said body portion having means fixed at a predetermined location thereon to seal said open end when the shank portion is so engaged in the barrel comprising, an enlarged annular formation, said formation comprising a split ring member frictionally engaged on the body portion at said location and a metal jacket overlying said ring member and said tapered end.

2. A soldering tip comprising, an integral, uniformly cylindrical metal member having a tapered tip portion for soldering and a shank portion commencing at the opposite end of the metal member, a ring member frictionally engaged on the tip portion adjacent said shank portion and a metal jacket overlying said ring, said jacket having a flat surface inclined relative to the longitudinal axis of the tip and facing toward said opposite end.

3. A soldering tip as described in claim 2 in which said ring has a triangular cross-section.

4. In a soldering iron having a barrel open at one end thereof for receiving a soldering tip and the barrel has a planar end face surrounding said open end; the herein invention consisting of, a soldering tip comprising, a solid, cylindrical metal member of uniform cross-section having a shank portion at one end thereof adapted to be slidingly engaged entirely within said barrel, a tapered opposite end and a body portion between said tapered end and shank portion, said body portion having means fixedly mounted at a predetermined location thereon to seal said open end when the shank portion is so engaged in the barrel, said means comprising a split metal resilient ring frictionally engaged around said body portion at said location and a metal jacket secured overlying said ring and on the body portion on opposite sides of the ring to form an enlarged circular formation, said jacket having a flat surface on one end of said sides adapted matingly to engage said end face of the barrel when the shank portion is so installed in the barrel.

5. A soldering tip as described in claim 4 in which said flat surface is inclined relative to the longitudinal axis of the soldering tip.

References Cited in the file of this patent

UNITED STATES PATENTS

| | | |
|---|---|---|
| 1,027,337 | Holmes | May 21, 1912 |
| 1,596,061 | Meyer | Aug. 17, 1926 |
| 1,661,226 | Martin | Mar. 6, 1928 |
| 1,994,994 | Hampton | Mar. 19, 1935 |
| 2,041,018 | Persons | May 19, 1936 |
| 2,588,531 | Johnson | Mar. 11, 1952 |
| 2,832,128 | Erdmann | Apr. 29, 1958 |
| 3,052,969 | Loven | Sept. 11, 1962 |

FOREIGN PATENTS

| | | |
|---|---|---|
| 9,447 | Great Britain | Aug. 18, 1842 |
| 536,932 | France | Feb. 22, 1922 |